May 30, 1950 — H. BAADE — 2,509,623
MEANS FOR OPERATING COLLAPSIBLE VEHICLE TOPS
Filed Feb. 24, 1945 — 4 Sheets-Sheet 1
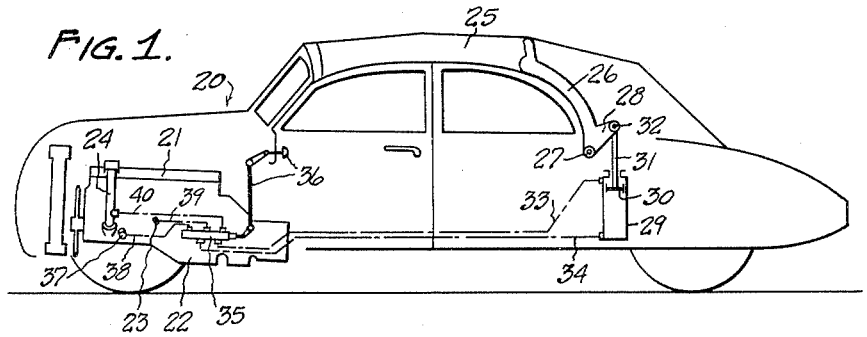
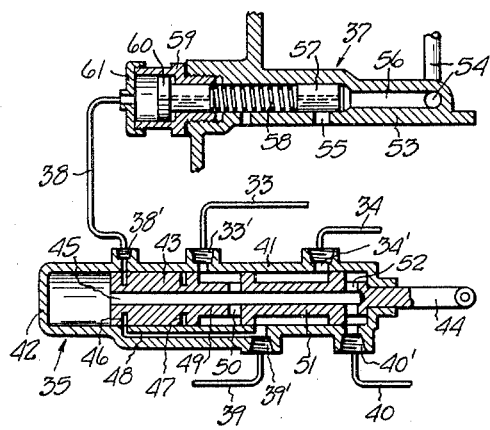
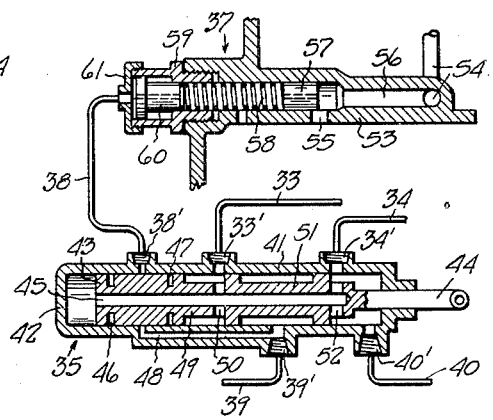
HENRY BAADE.
INVENTOR.
BY Oltsch & Knoblock
ATTORNEYS.

May 30, 1950  H. BAADE  2,509,623
MEANS FOR OPERATING COLLAPSIBLE VEHICLE TOPS
Filed Feb. 24, 1945  4 Sheets-Sheet 2
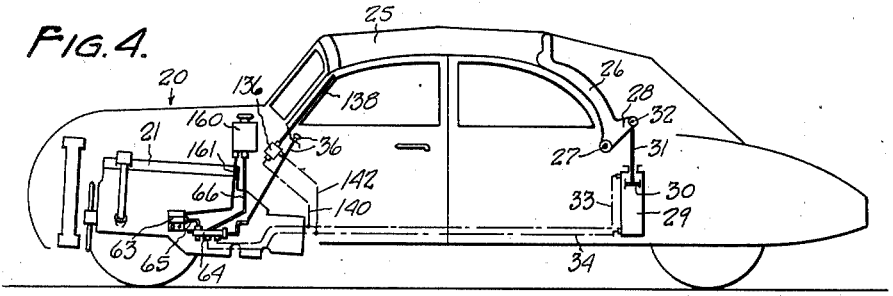
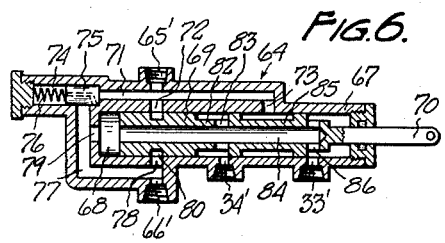
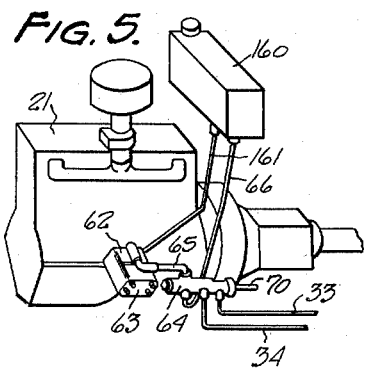
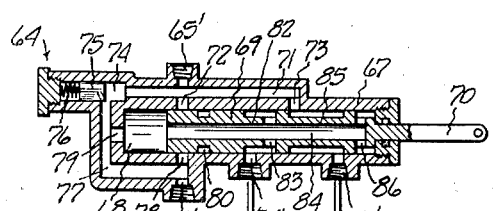
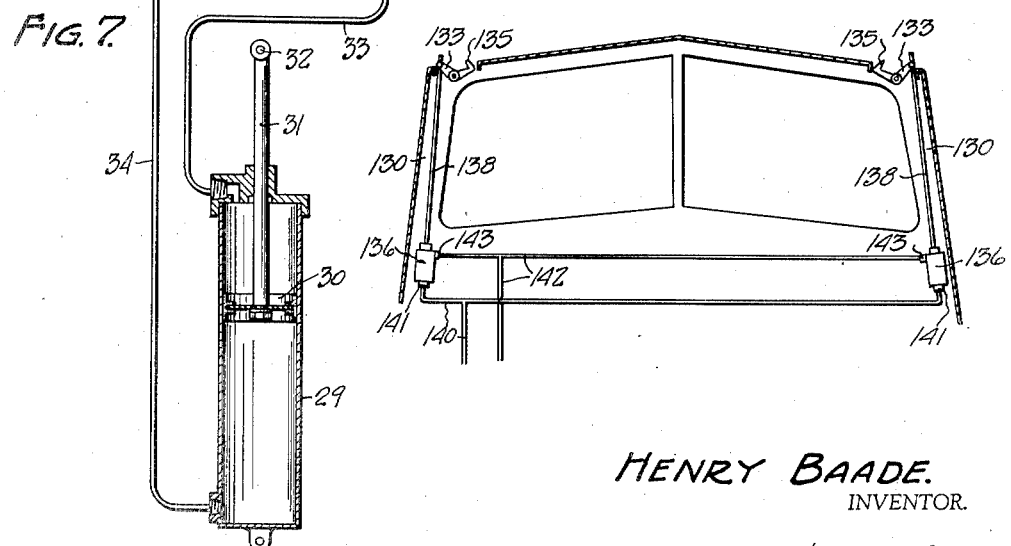
HENRY BAADE.
INVENTOR.
BY Oltsch & Knobloch
ATTORNEYS.

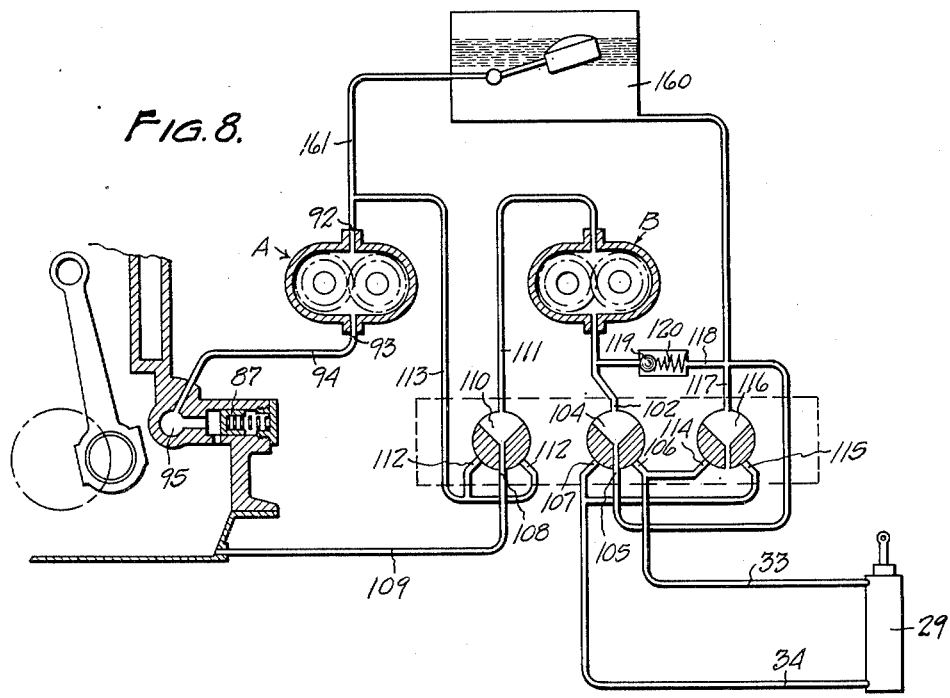
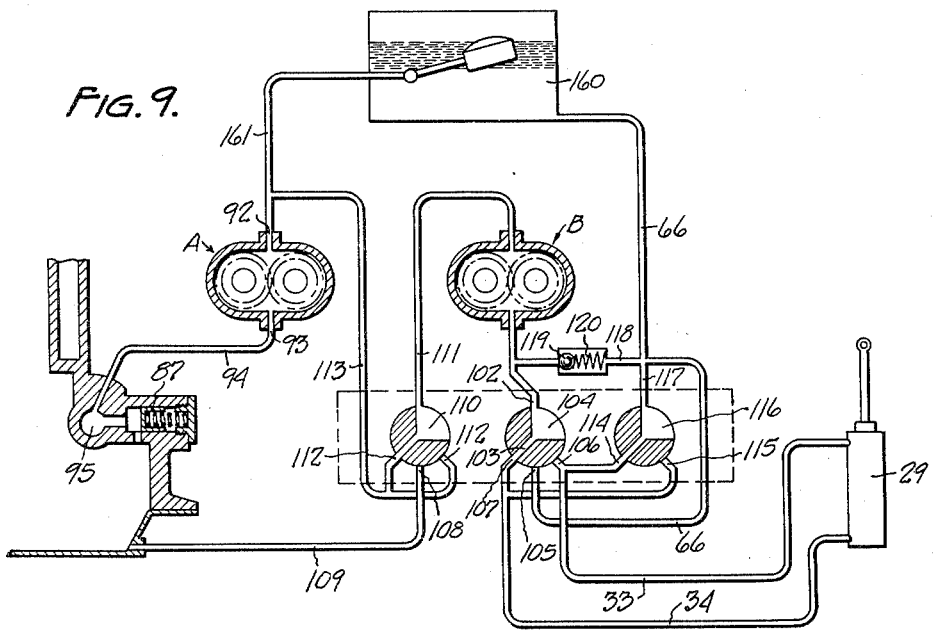

May 30, 1950 — H. BAADE — 2,509,623
MEANS FOR OPERATING COLLAPSIBLE VEHICLE TOPS
Filed Feb. 24, 1945 — 4 Sheets-Sheet 4
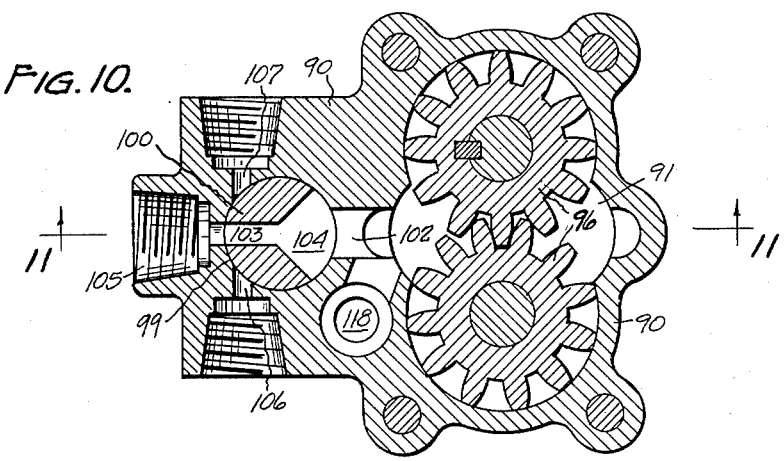
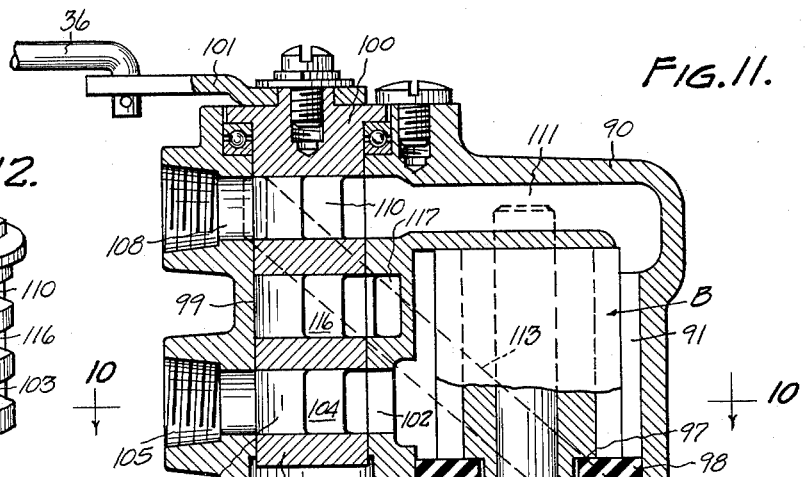
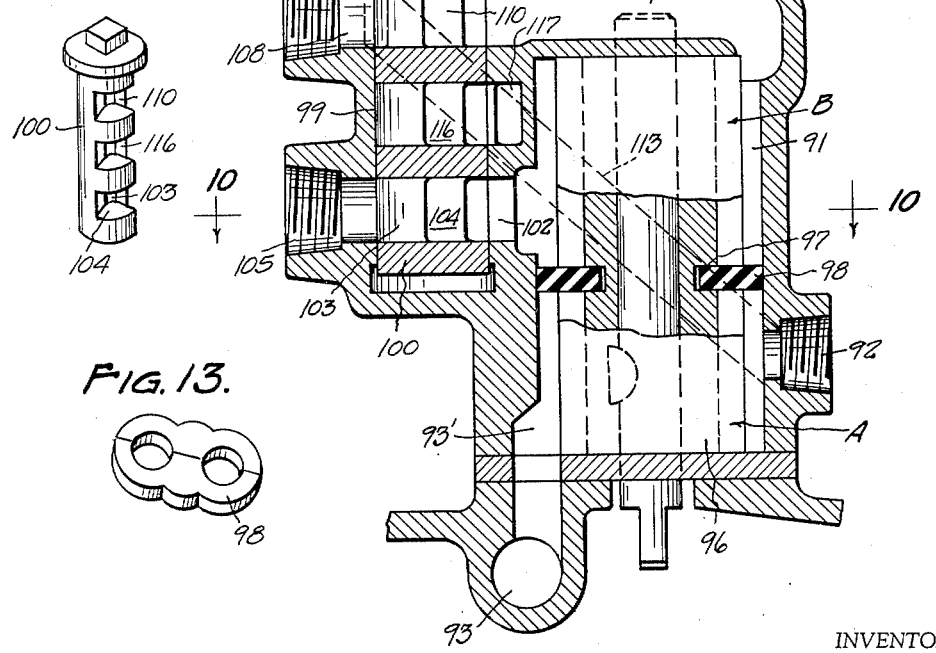
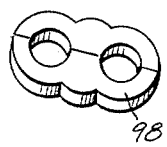
INVENTOR.
HENRY BAADE.
BY Oltsch & Knoblock
ATTORNEYS.

Patented May 30, 1950

2,509,623

UNITED STATES PATENT OFFICE 2,509,623

MEANS FOR OPERATING COLLAPSIBLE VEHICLE TOPS

Henry Baade, Cleveland, Ohio, assignor of one-fourth to Leo L. Jaskey, one-fourth to Harold O. Zander, and one-fourth to Paul Kuehl Application February 24, 1945, Serial No. 579,638

18 Claims. (Cl. 296—117)

This invention relates to improvements in means for operating a collapsible vehicle top. More particularly, the invention relates to hydraulic means for operating the collapsible top of an automobile.

The primary object of the invention is to provide novel, simple hydraulic means for operating an automobile top which can be connected directly with an automobile lubricating system of any standard type.

A further object is to provide a device of this character which is adapted to increase the operating pressure in the lubricating system of an automotive vehicle during the time the collapsible top is being operated and to return the oil pressure to normal as soon as the operation of the top is completed.

A further object is to provide hydraulic means for operating a collapsible vehicle top with a pressure regulating valve operating to increase the pressure in the hydraulic system whenever a top-controlling valve is shifted from its neutral to one of its operating positions.

A further object is to provide novel means for controlling the top of a vehicle having a dry sump type of engine lubricating system.

A further object is to provide a novel pump for powering a high pressure hydraulic vehicle top-operating member and a low pressure engine lubricating means in a dry sump type of engine lubricating system.

A further object is to provide a device for operating a collapsible vehicle top with means properly correlated therewith for automatically controlling latching mechanism for the vehicle top.

A further object is to provide a hydraulic device for operating a collapsible vehicle top with hydraulically operated top-latching means.

Other objects will be apparent from the description, drawings and appended claims.

In the drawing:

Fig. 1 is a diagrammatic view illustrating the top-operating device applied to an automobile having a conventional lubricating system.

Fig. 2 is a fragmentary sectional view of the control parts of the device in neutral position.

Fig. 3 is a fragmentary sectional view of the control parts of the device in one operating position.

Fig. 4 is a diagrammatic view illustrating the top-operating device applied to an automobile having a dry sump type of lubricating system.

Fig. 5 is a perspective view of an engine having a dry sump lubricating system and which illustrates certain of the control and operating parts of the top-operating means.

Fig. 6 is a longitudinal sectional view of the control valve used in the Fig. 4 system, in neutral position.

Fig. 7 is a sectional view of the control valve and actuator of the Fig. 4 system in one top-operating position.

Fig. 8 is a schematic view of a hydraulic system associated with a lubricating system of the dry sump type in neutral position.

Fig. 9 is a schematic view similar to Fig. 8, in one top-operating adjustment.

Fig. 10 is a transverse sectional view taken on line 10—10 of Fig. 11, of a pump and valve unit adapted for use in the Fig. 4 system.

Fig. 11 is a longitudinal sectional view taken on line 11—11 of Fig. 10.

Fig. 12 is a reduced perspective view of the valve rotor of the pump and valve unit shown in Figs. 10 and 11.

Fig. 13 is a reduced perspective view of a separator used in the pump and valve unit shown in Figs. 10 and 11.

Fig. 14 is a fragmentary front view of a vehicle, with parts shown in section to illustrate the top latch and the actuating means therefor.

Fig. 15 is a fragmentary sectional view of the top latching means in released position when the vehicle top is raised.

Fig. 16 is a fragmentary sectional view illustrating the top latching means in another operative position.

Fig. 17 is a fragmentary sectional view illustrating the top latching means in latching position.

Referring to the drawings, and particularly to Figs. 1 to 3 which illustrate one embodiment of the invention, the numeral 20 designates an automobile having an engine 21 with a conventional lubricating system including an oil pump (not shown), an oil pan or sump 22, a main oil gallery 23 and an oil return 24.

The automobile is of the so-called "convertible" type, which has a collapsible top 25 of any suitable construction. One or more operating levers 26 control the operation of the top 25. Each lever 26 is pivotally mounted on the automobile body at 27 and a portion 28 projects from the lower end thereof. A hydraulic cylinder 29 is mounted on the automobile below the free end of the lever part 28. Cylinder 29 receives a double-acting piston 30 connected to a rod 31 which projects through the upper end of the cylinder and has pivotally connected thereto at 32 the free end of lever portion 28. An oil line 33 is connected to the upper end of cylinder 29 and an oil line 34 is connected to the lower end of cylinder 29 for supplying and relieving pressure at the opposite sides of the piston to actuate the same and the lever 26.

A control valve 35 is connected with the engine lubricating system, and the oil lines 33 and 34 are connected with and controlled thereby. Valve 35 is also connected with suitable means 36 for operating the same which preferably extend to the instrument panel of the automobile to be conveniently operated by the driver. A pressure relief valve 37 is also connected with the engine lubricating system, being interposed between oil gallery 23 and oil return 24 in parallel to valve 35. A line 38 connects valves 37 and 35; a line 39 connects main oil gallery 23 with control valve 35; and a return line 40 connects valve 35 with the oil return 24.

The control valve 35 may be of any suitable type. As here illustrated it has an elongated tubular body 41 closed at 42 at one end and provided with ports 33', 34', 38', 39' and 40' at spaced points along its length for connection of the oil lines previously mentioned. An elongated valve element 43 is slidable within the body 41 and has a stem 44 projecting at one end of the body and adapted for connection of the valve operating means 36 therewith. The valve element has an axial bore 45. The inner end portion of the valve element 43 has a snug sliding fit within the body and has a pair of circumferential grooves 46 and 47 spaced apart a distance equal to the full operative range of adjustment of the valve element. These grooves are adapted to selectively connect port 38' with a longitudinal bore 48 in body 41 which branches from port 34'. An inner reduced dimension portion or neck 49 is of a length approximately one-half the length of the full operating movement of the valve element, and ports 50 extend through portion 49. An outer reduced dimension portion or neck 51 of a length substantially equal to the full stroke or range of movement of the valve element 43 is formed in close spaced relation to neck 49. The front portion of the valve element at which the stem 44' is connected is also reduced and has a transverse bore 52 communicating with bore 45.

The pressure relief valve 37 has an elongated body 53 connected with the main gallery and the crankcase of the lubricating system at longitudinally spaced ports 54 and 55 respectively. A longitudinal bore 56 communicates with ports 54 and 55 and is enlarged at the portion with which port 55 communicates. A valve element 57 is slidable longitudinally at the inner end of the enlarged portion of the bore to control the port 55. A spring 58 presses the valve element 57 toward seated position. An adapter 59 is mounted in the open end of the body and slidably receives a plunger 60 which serves to control the valve loading by bodily shifting the spring 58. A cap 61 closes the outer end of the adapter and line 38 connects with a port in said cap.

When the control valve 35 is positioned in its neutral position shown in Fig. 2, the lubricating system of the engine functions at a low normal pressure, for example, at about 35 pounds pressure. Oil flows freely from the main gallery 23 through port 54, bore 56 and port 55 of pressure relief valve 37 to the crankcase. Pressure in lines 33 and 34 is relieved by their connection with line 40 by bores 45, 50 and 52.

When the top is to be operated, the valve element 43 of control valve 35 is shifted to an operative position at which one of grooves 46 or 47 registers with port 38'. Fig. 3 illustrates the top raising position of the control valves. Oil from the main gallery entering the valve 35 from the line 39 flows through bore 48 and also around the reduced valve portion 51 to the selected one of the lines 33, 34 to the cylinder 29, as to the line 34 in the "raise" position shown in Fig. 3. The oil flowing in bore 48 passes through the groove 46 and 47 registering with the end of said bore to line 38 and the adapter 59 of pressure relief valve 37. The pressure in the adapter acts upon plunger 60 and causes the same to increase the loading of the valve by shifting the spring 58, thereby shifting the valve element 57 to close the port 55. The stoppage of the flow of oil from the main gallery 23 to the crankcase through the pressure relief valve 37 increases the operating pressure in the system automatically to a selected value, for example, from 80 to 100 pounds, adequate for the purpose of operating the top 25 by shifting piston 30 in cylinder 29. When the selected pressure is reached the plunger, valve and spring adjust automatically to maintain it within the entire hydraulic system by controlling flow through port 55.

As soon as the valve 35 is returned to neutral, following completion of the operation of the top 25, the operating pressure returns to normal by virtue of the flow of oil through the restricted bleed ports in members 57 and 60 illustrated in dotted lines closing of port 38' of valve 35. Therefore, by the simple arrangement of parts illustrated, the operating pressures are automatically adjusted between two selected values for two different conditions and purposes. This obviates the need for an independent hydraulic system, with an individual reservoir, operating pump, and the like, which has been necessary heretofore to actuate a hydraulic top-operating device at the relatively high pressure required therefor as compared to the normal operating pressure of a lubricating system of an automobile engine. Inasmuch as the top-operating mechanism is used infrequently and the time of operation either to raise or lower the top is of very short duration, the increase in pressure at the lubricating system is not serious nor detrimental; and a pressure relief valve similar to that hereinafter described can be provided in the lubricating system to avoid adverse pressure effects.

The application of the invention to an automobile whose engine has a dry sump type of lubricating system is illustrated in Figs. 4 to 7. Such a lubricating system is characterized by the provision of an oil reservoir 160 spaced from the engine. Oil flows from reservoir 160 through a line 161 to a pressure pump 62 which supplies the required pressure for the lubricating circuit. The return of oil from the lubricating circuit to the reservoir is through a scavenging pump 63. A combination pressure regulating and control valve 64, operated by control mechanism 36, is connected by line 65 with the scavenging pump 63 and by a line 66 with the reservoir 160. Lines 33 and 34 are also connected to the valve 64.

The valve 64 has a body 67 provided with a main bore 68 in which a valve element 69 shifts longitudinally by virtue of the connection of its stem 70 with control mechanism 36. Body 67 has a port 65' to which line 65 is connected. Port 65' communicates with a longitudinal bore 71 in one side of the body which communicates with bore 68 at longitudinally spaced ports 72 and 73. A passage 74 at the end of the body communicates with bore 71 and slidably receives a valve element 75 which is normally urged to position to close the end of bore 71 by means of a spring 76. A passage 77 communicates with passage 74 and leads to a port 66' with which line 66 is connected. A port 78 connects passage 77 with bore 68 opposite port 66', and a port 79 connects the end of bore 68 with passage 77.

Valve element 69 has a groove 80 which establishes communication between ports 72 and 78 in the neutral position of the valve 64. An inner reduced portion or neck 82 of a length approximately one-half the total travel of valve element 69 normally registers with the port 34' connected with line 34 and extends therefrom in the direction of groove 80. Ports 83 pass through neck 82 to communicate with a central longitudinal bore 84 in the valve element 69. A second reduced neck portion 85 on the valve is spaced from neck 82 less than one-half the travel of the valve element and is of a length at least equal to the longitudinal displacement of the ports 33' and 34' from the bore 73. The outer end of the valve element is of reduced dimension and has a transverse bore 86 which communicates with the inner end of bore 84.

The neutral position of the valve element 69 is illustrated in Fig. 6, being positioned intermediate its path of travel in body 67. In this position the groove 80 establishes communication between ports 65' and 66' through ports 72 and 78. Valve 75 is closed. Ports 33' and 34' are closed relative to line 65 but are subject to pressure equalization through communication by ports 83 and 86, bore 84, port 79 and passage 77, with port 66'. Normal lubricating pressure, say 35 pounds, is maintained at the setting.

Upon actuation of the valve element to either operating position, the direct connection between ports 65' and 66' by way of groove 78 is stopped, and oil flows in passage 71 to port 73 and around neck 85 to the selected one of the ports 33', 34'. This results in an increase in the pressure in the scavenging system to a point determined by the loading of spring 76, say to a value of 80 to 100 pounds, required to actuate the piston 30 in cylinder 29. When this operating pressure is reached, the pressure in passage 71 shifts the valve 75 to permit flow therefrom through passage 77 to port 66' at the increased pressure. Subsequent return of valve 64 to neutral, immediately returns the system to normal low pressure. In this connection it will be understood that the use of separate pressure and scavenging pumps 62—63 in this type of system insures normal maintainance of low operating pressure by means of a standard pressure relief valve, such as valve 87 (Fig. 8) associated with the pressure pump at the engine.

An alternative construction adapted for use with the dry sump type of lubricating system is illustrated in Figs. 8 to 13. This construction entails the use of a combination valve and pump unit of the type illustrated in Figs. 10–11. The combination unit comprises a housing 90 having a pump chamber 91 with which a port 92 connected with line 161 from reservoir 160 communicates. A port 93 and passage 93' serve to connect a line 94 to the oil gallery 95 (Fig. 8) with the pump chamber. A pair of meshing pump gears 96 are journaled in the housing 90. The gears are grooved at 97 intermediate their ends. A pair of complementary plastic plates or separators 98, best illustrated in Fig. 13, fit snugly within the pump chamber 91 and within the grooves 97 to separate or divide the pump chamber. The portion A of the pump with which ports 92 and 93 communicate thus becomes a pressure pump and the remaining portion B of the pump becomes the scavenging pump in the lubricating system.

At one side of and parallel to the pump chamber 91, a valve chamber 99 is formed in housing 90. An elongated rotatable valve element 100 is journaled in chamber 99 and projects therefrom to mount on arm 101 adapted for connection with valve operating mechanism 36. A port 102 connects the scavenging portion B of the pump with the valve chamber 99 at a point at which valve element 100 has a transverse passage 103 provided with a flaring mouth 104 communicating with port 102. A port 105 in body 90 with which passage 103 is adapted to register, communicates with valve chamber 99 and is adapted for connection with the return line 66 to reservoir 160. At the same level as port 105 but angularly disposed relative thereto are ports 106 and 107 communicating tangentially with valve chamber 99 and adapted for connection with lines 33 and 34 respectively. Adjacent to the upper end of body 90 is a port 108 connected by a line 109 with the oil pan of the engine and communicating with the valve chamber at the level of a valve passage 110 similar to passage 103, 104. A passage 111 in the valve body at this level connects the valve chamber with the scavenging portion B of the pump. A pair of angularly disposed ports 112 are formed in the body at the same level as port 108 and at the same angular relation thereto that ports 106 and 107 bear to port 105. Ports 112 are connected by passage 113 in the valve body with port 92 which receives oil from the reservoir. A third pair of angularly disposed ports 114 and 115 are provided in body 90 intermediate the ports 105 and 108 and communicate with branches of the lines 33 and 34. Valve element 100 has a port 116 similar to port 103, 104 at the level of and adapted to communicate with the ports 114 and 115. The flaring end of the valve port 116 communicates with a passage 117 which branches from return line 66. A passage 118 in the valve body connects ports 102 and 117 and has a pressure regulating valve 119 loaded by a spring 120 therein to normally oppose flow from port 102 to port 117.

In the normal position of the valve 100 as illustrated in Fig. 8, the flow of oil is limited to the following circuit: from reservoir 160 through line 161, pressure pump A, line 94, gallery 95, line 109, valve port 108, passage 111, scavenging pump B, ports 102, 103, 105, and line 66 back to the reservoir. Pressure relief valve 87 controls the pressure within gallery 95 to the desired lubricating pressure. When valve 100 is adjusted from its neutral position to either the top-raising position shown in Fig. 9 or to the top-lowering position, the port 108 is closed, thereby increasing the pressure in the scavenging system to the value for which spring 120 and valve 119 are adjusted. Flow of oil is then obtained from reservoir 160, line 161, passage 113, the selected one of ports 112, valve passage 110, passage 111, scavenge pump portion B, ports 102 and 103 and the selected one of ports 106, 107, to the cylinder 29. The oil displaced from the cylinder 29 passes to the selected one of ports 114, 115 and through valve port 116 and passage 117 to the return line 66 to the reservoir 160. As soon as the pressure for which valve 119 is set is reached, said valve opens for restricted flow direct from pump portion B to return line 66 to avoid development of excessive pressure in the system. The pressure within the oil gallery 95 is held at safe limits for the short time required to operate the top by means of valve 87.

A further feature of the invention is illustrated in Figs. 15 to 17 and provides for automatic operation of the means by which the top 25 is locked in its raised position. The free end portion 125 of top has a latch receiving recess 126 therein at each side thereof, and a metal plate 127 at the bottom thereof spans each recess 126. Plate 127 has a latch receiving opening 128 and a pin receiving neck 129. The auto body has hollow vertical windshield posts 130 and a hollow upper longitudinal portion 131. A pin 132 is adapted to fit in neck 129 to properly position the top when in its raised position (Figs. 16–17). At the junction between post 130 and frame portion 131, a bellcrank 133 is pivoted at 134. Bellcrank 133 has a latch 135 at one end which is adapted to pass through aperture 128 and to engage or hook upon the plate 127 as shown in Fig. 17. A cylinder 136 is mounted in the auto body at the lower end of each post 130 and a double acting piston 137 is reciprocable therein and is connected to a rod 138 passing upwardly through the post. The bellcrank 133 is pivoted at 139 to rod 138 in spaced relation below the end of the rod. A suitable opening in the frame permits the rod 138 to engage the plate 127. A line 140 connects the line 33 with a port 141 in the bottom of cylinder 136. A line 142 connects line 34 with a port 143 in the side of the upper portion of the cylinder 136.

The operation of the top latching mechanism is as follows: Assuming the parts to be in the raised-top or latched position illustrated in Fig. 17, operation of the control member 36 to top-lowering position introduces hydraulic pressure in lines 33 and 140 to shift the rod 138 upwardly to the position shown in Fig. 16, thereby shifting the bellcrank 133 to disengage the latch 13 from the top 125. This operation is effective at a lower pressure than is required to operate piston 30 in cylinder 29, so that the latch is automatically disengaged when the required pressure to operate piston 29 is reached.

Upon reverse operation of the top from lowered to raised position, the piston 137 is inoperative upon manipulation of the control 36 by virtue of the positioning of piston 137 to close port 143 as illustrated in Fig. 16. Consequently the bellcrank latch remains in its Fig. 16 position until the plate 127 strikes the upper end of rod 138 to shift said rod and the piston 137 downwardly to the Fig. 17 position wherein the port 143 is opened. Thereupon the oil is free to flow from pressure line 34 through line 142 into the upper end of cylinder 136 to lower the piston and pivot the bellcrank 133 to engage the latch 135 with plate 127. In other words, the latch 135 is held inoperative until the top is in position to be engaged and latched thereby.

It will be understood, of course, that other means than that illustrated can be employed to achieve the advantage of automatic latch operation. For example, double acting electrical means such as a solenoid responsive respectively to fluid pressure in the lowering circuit and to the movement of the top to raised position may be employed.

The advantages of the device will be apparent from the above description of its construction and operation. The principal advantages to which attention is directed particularly are that the device works from the engine lubricating system and therefore eliminates the need for a separate hydraulic system for the top with its attendant cost, complications and space requirements; that the device includes simple means for providing high operating pressures when required for operation of the top and normally maintains only a low operating pressure adequate for the lubricating circuit; that only one control need be operated to operate the top and the latching means therefor in proper sequence; and that automatic operation of the top latching means in proper relation to the top-operating means avoids all possibility of damaging the system or the top as might occur if proper operation of the latching means should be neglected or overlooked.

I claim:

1. The combination with an automotive vehicle having a collapsible top and a forced flow engine lubricating system including a reservoir and a return line leading to said reservoir, of a double acting hydraulic power member for actuating said top, a control valve, a pressure regulating valve, and means connecting said power member and control valve, each of said valves being interposed in said return line, said control valve being adapted to simultaneously close said regulating valve and by-pass flow in said return line through said connecting means to said power member in a manner to increase the pressure in the portion of said return line leading to said power member.

2. The combination with an automotive vehicle having a collapsible top and a forced flow engine lubricating system including a sump and a return line leading to said sump, of a double acting hydraulic power member for actuating said top, a valving control unit interposed in said return line, branch lines controlled by said control unit for connecting said power member to said return line, said control unit being actuable to control flow in said return line and connect a selected branch line therewith in a manner to increase the pressure in said branch line leading to said power member, and means for limiting the pressure in said last named line to a predetermined value.

3. The combination with an automobile having a collapsible top and a low pressure forced flow engine lubricating system including a reservoir and a return line leading thereto, of a hydraulic top-operating member, a control unit interposed in said return line and having a neutral position and at least two top-operating positions, fluid lines between said return line and top-operating member and selectively opened into communication with said return line at the different operating positions of said control unit, said control unit restricting flow to said reservoir to increase the pressure in the supply line communicating with said top-operating member at both of its operating positions, and means for limiting the pressure increase in said last named line.

4. In an automobile having a collapsible top and a low pressure flow engine lubricating system including a sump and a return line leading to said sump, hydraulic means operable at a predetermined high pressure to actuate said top, a valving control unit interposed in said return line, fluid branch lines controlled by said unit and connecting said return line and hydraulic means, said unit being operable selectively to limit flow to said return line only, or to direct flow to a selected branch line and restrict flow to said sump to increase the fluid operating pressure effective at said unit, and a relief valve responsive to increase of pressure in said return line and connected to direct fluid to said sump and thereby limit pressure increase to said predetermined high pressure for actuating said hydraulic means.

5. In an automobile having a collapsible top and a low pressure forced flow lubricating system including an oil gallery, a sump, and a return line connecting said gallery and sump, a high pressure hydraulic member for actuating said top, a normally open pressure relief valve and a control valve each interposed in said return line, branch lines connecting said return line with said hydraulic member and normally closed by said control valve, and normally inoperative hydraulic pressure loading means on said relief valve connected with said control valve, said control valve having an operating position in which it directs liquid from said gallery to said loading means to close said relief valve and simultaneously directs liquid from said gallery solely through a branch line to said hydraulic member.

6. In an automobile having a collapsible top and a low pressure forced flow engine lubricating system including a sump and a return line leading thereto, a high pressure hydraulic actuator for operating said top, a pressure relief valve and a control valve connected in said return line in parallel, branch lines connecting said actuator to said return line and normally closed by said control valve, said relief valve having a pressure loading spring and a normally inoperative hydraulically operable loading means, a line connecting said control valve with said last named loading means, said control valve having a neutral position and two operative positions, said control valve simultaneously connecting said hydraulically operable loading means and a selected actuator line with said return line and stopping direct flow to said sump to increase the pressure in the selected branch line connected to said actuator when in either operating position.

7. In an automobile having a collapsible top and a low pressure forced flow engine lubricating system of the dry sump type including a reservoir, a pressure pump, a scavenging pump and a return line connecting said scavenging pump and reservoir, a control valve connected in said return line between said scavenging pump and reservoir; a high pressure hydraulic top-actuator, branch lines connecting said actuator with said return line and normally closed by said valve, said valve being operable to direct flow from said scavenging pump to a selected branch line and to stop direct flow from said pump through said return line to said reservoir so as to increase the pressure in the selected branch line connected to said top-actuator, and means for limiting the pressure increase in said last named line.

8. In an automobile having a collapsible top and a low pressure forced flow engine lubricating system of the dry sump type including a scavenge pump, a reservoir and a return line connecting said pump and reservoir, a control valve interposed in said return line, a high pressure hydraulic motor for actuating said top, branch lines connecting said motor with said return line and normally closed by said valve, said valve being actuable to divert flow from said pump to a selected branch line and simultaneously stop flow from said pump through said return line direct to said reservoir to increase the pressure in said selected branch line leading to said motor, a bypass in said return line, and a normally closed valve in said by-pass adapted to be opened by a predetermined pressure condition in said selected branch line leading to said motor.

9. In an automobile having a collapsible top and a low pressure forced flow engine lubricating system of the dry sump type including a scavenge pump, a reservoir and a return line connecting said pump and reservoir, a control valve interposed in said return line, a high presure hydraulic motor for actuating said top, branch lines connecting said motor with said return line and normally closed by said valve, said valve being actuable to divert flow from said pump to a selected branch line and simultaneously stop flow from said pump through said return line direct to said reservoir to increase the pressure in the selected branch line connected to said motor, a by-pass in said valve providing a secondary flow path to said reservoir when said valve is in flow-diverting position, and a spring loaded valve normally closing said by-pass and acting against flow from said pump for release by a flow of predetermined high pressure.

10. In an automobile having a collapsible top and a low pressure forced flow engine lubricating system of the dry sump type including a reservoir, a pressure pump, a scavenge pump and a return line connected to said scavenge pump and reservoir, a control valve connected in said return line between said scavenge pump and reservoir, a high pressure hydraulic top-actuator, branch lines connecting said actuator with said return line under the control of said valve, said valve having a neutral position closing said branch lines and two operating positions for opening selected branch lines and restricting flow from said scavenge pump direct to said reservoir to increase the pressure in the selected branch line connected to said top-actuator, and pressure responsive means for regulating the pressure in said return line ahead of said valve when said valve is in either of its operating positions.

11. In an automobile having a collapsible top and a low pressure forced flow engine lubricating system of the dry sump type including a reservoir, a pressure pump, a scavenge pump and a return line connecting said scavenge pump and reservoir, a control valve connected in said return line between said scavenge pump and reservoir, a high pressure hydraulic top-actuator, branch lines connecting said actuator with said return line under the control of said valve, said valve having a neutral position closing said branch lines and two operating positions for opening selected branch lines and restricting flow from said scavenge pump direct to said reservoir to increase the pressure in the selected branch line connected to said top-actuator, and pressure responsive means for regulating the pressure in said last named line when said valve is in either of its operating positions, said pumps having a common chambered housing and common elongated meshing gears grooved intermediate their ends, and a separator spanning said chamber and seated in said grooves to define separate pressure and scavenge pump sections.

12. In an automobile having a collapsible top and a latch therefor, a hydraulic top-actuator, means for supplying liquid under pressure to said actuator, a hydraulic latch actuator connected to said liquid supply means, and means for barring the liquid flow for operation of said latch actuator to latching position, said top actuating said last named means to permit liquid flow to said latch actuator when said top reaches operative raised position.

13. In an automobile having a collapsible top and a latch therefor, a double-acting hydraulic top actuator, a double acting hydraulic latch actuator, means for simultaneously supplying liquid under pressure to said actuators and including a controller, said latch actuator including a valve for preventing liquid flow to said latch actuator after each latch closing operation of said latch actuator, said valve being operable to open position by said top at a predetermined position of said top to permit latch engaging operation of said latch actuator.

14. In an automobile having a collapsible top and a latch therefor, a double-acting hydraulic top actuator, a double acting hydraulic latch actuator, means for simultaneously supplying liquid under pressure to said actuators and including a controller, said latch actuator including a cylinder having ports at opposite ends, a double acting piston in said cylinder, one port being located in a side wall to be closed by said piston at the latch-releasing end of its stroke, and a piston rod connected to said latch and projecting into the path of said top when said latch is released.

15. In an automobile having a collapsible top and a latch therefor, a double acting hydraulic top-actuator, means for supplying liquid under pressure to said actuator and including a controller having neutral and top raising and lowering positions, a double acting latch actuator, means responsive to top lowering actuation of said controller for controlling said latch actuator to release said latch, and means responsive to the position of and actuable by said top for controlling said latch actuator to delay engagement of said latch until top raising operation of said top actuator is completed.

16. In an automobile having a collapsible top and a latch therefor having engaged and released positions, power operated means responsive to a controller for selectively raising and lowering said top, a latch actuator responsive to top lowering actuation of said controller for releasing said latch, and means associated with said latch actuator and positioned in the path of said top when said latch is in released position, said means being shiftable by said top to condition said latch actuator to engage said latch.

17. In an automobile having a collapsible top and a latch therefor, power operated means for selectively raising and lowering said top, a latch actuator correlated with said top operating means and operable in releasing direction when said top operating means is conditioned to lower said top, and time delay means associated with said latch actuator for restraining latch-engaging operation of said latch actuator relative to top raising action of said top operator until said top reaches operative raised position and actuates said time delay means.

18. In an automobile having a collapsible top and a latch therefor, a double-acting hydraulic top actuator, a double-acting hydraulic latch actuator, means for simultaneously supplying liquid under pressure to said actuators and including a controller, said latch actuator including means projecting into the path of said top for conditioning said latch actuator for latch applying operation.

HENRY BAADE.

REFERENCES CITED

The following references are of record in the file of this patent:

UNITED STATES PATENTS

| Number | Name | Date |
| --- | --- | --- |
| 1,025,341 | Turner | May 7, 1912 |
| 1,200,239 | Richert | Oct. 3, 1916 |
| 1,555,174 | Williams | Sept. 29, 1925 |
| 1,639,284 | Bragg et al. | Aug. 16, 1927 |
| 1,756,977 | Enlind | May 6, 1930 |
| 1,775,856 | Hauser | Sept. 16, 1930 |
| 1,818,768 | Swartwout | Aug. 11, 1931 |
| 1,888,542 | Rosberg | Nov. 22, 1932 |
| 1,908,614 | Maloon | May 9, 1933 |
| 2,088,908 | Horton | Aug. 3, 1937 |
| 2,161,917 | Forsyth et al. | June 13, 1939 |
| 2,243,364 | Trautman | May 27, 1941 |
| 2,247,140 | Twyman | June 24, 1941 |
| 2,268,653 | Flowers | Jan. 6, 1942 |
| 2,297,381 | Wylie | Sept. 29, 1942 |
| 2,331,603 | Falcon | Oct. 12, 1943 |
| 2,340,524 | Fischel | Feb. 1, 1944 |
| 2,361,954 | Martin | Nov. 7, 1944 |
| 2,391,629 | Keller | Dec. 25, 1945 |

FOREIGN PATENTS

| Number | Country | Date |
| --- | --- | --- |
| 75,805 | Switzerland | Sept. 2, 1918 |
| 499,606 | Great Britain | 1939 |